United States Patent
Kamkar-Parsi et al.

(10) Patent No.: US 11,889,268 B2
(45) Date of Patent: Jan. 30, 2024

(54) METHOD FOR OPERATING A HEARING AID SYSTEM HAVING A HEARING INSTRUMENT, HEARING AID SYSTEM AND HEARING INSTRUMENT

(71) Applicant: Sivantos Pte. Ltd., Singapore (SG)

(72) Inventors: Homayoun Kamkar-Parsi, Erlangen (DE); Robert Kasanmascheff, Adelsdorf (DE)

(73) Assignee: Sivantos Pte. Ltd., Singapore (SG)

( * ) Notice: Subject to any disclaimer, the term of this patent is extended or adjusted under 35 U.S.C. 154(b) by 211 days.

(21) Appl. No.: 17/557,397

(22) Filed: Dec. 21, 2021

(65) Prior Publication Data
US 2022/0201406 A1    Jun. 23, 2022

(30) Foreign Application Priority Data
Dec. 21, 2020  (DE) ..................... 10 2020 216 439.8

(51) Int. Cl.
*H04R 25/00* (2006.01)
*G06N 3/063* (2023.01)

(52) U.S. Cl.
CPC ........... *H04R 25/507* (2013.01); *G06N 3/063* (2013.01); *H04R 25/552* (2013.01)

(58) Field of Classification Search
None
See application file for complete search history.

(56) References Cited

U.S. PATENT DOCUMENTS

| | | |
|---|---|---|
| 7,502,483 B2 | 3/2009 | Rikimaru |
| 7,773,763 B2 | 8/2010 | Pedersen |
| 2020/0211580 A1* | 7/2020 | Lee .................. G06F 17/18 |
| 2020/0241834 A1 | 7/2020 | Boeen et al. |
| 2020/0260198 A1 | 8/2020 | Andersen et al. |

FOREIGN PATENT DOCUMENTS

| | | |
|---|---|---|
| DE | 102019206743 A1 | 11/2020 |
| JP | 2004135068 A | 4/2004 |
| JP | 2007507119 A | 3/2007 |
| JP | 2017005356 A | 1/2017 |

* cited by examiner

*Primary Examiner* — Kenny H Truong
(74) *Attorney, Agent, or Firm* — Laurence A. Greenberg; Werner H. Stemer; Ralph E. Locher

(57) ABSTRACT

A method operates a hearing aid system having a hearing instrument. An electro-acoustic input transducer of the hearing instrument generates an input signal from an acoustic signal from the environment, and an output signal is generated from the input signal by a signal processor. An output acoustic signal is generated from the output signal by an electro-acoustic output transducer of the hearing instrument. For at least one sub-process of the signal processing an artificial neural network is used which is implemented in the hearing instrument. A topology of the artificial neural network is defined and/or weights between individual neurons of the artificial neural network are selected according to an operation to be performed in the sub-process and/or according to an ambient situation and/or according to a user input by a user of the hearing aid system.

10 Claims, 3 Drawing Sheets

METHOD FOR OPERATING A HEARING AID SYSTEM HAVING A HEARING INSTRUMENT, HEARING AID SYSTEM AND HEARING INSTRUMENT

CROSS-REFERENCE TO RELATED APPLICATION

This application claims the priority, under 35 U.S.C. § 119, of German Patent Application DE 10 2020 216 439.8, filed Dec. 21, 2020; the prior application is herewith incorporated by reference in its entirety.

FIELD AND BACKGROUND OF THE INVENTION

The invention relates to a method for operating a hearing aid system having a hearing instrument, wherein at least one electro-acoustic input transducer of the hearing instrument generates an input signal from an acoustic signal from the environment. An output signal is generated from the input signal by means of a signal processor and an output acoustic signal is preferably generated from the output signal by an electro-acoustic output transducer of the hearing instrument.

The term "hearing instrument" is usually understood to mean devices that are used to output sound signals to the auditory system or, more generally, to the auditory cortex of a user of the corresponding device. In particular, this term covers hearing aids. Hearing aids are used by people with hearing impairment to compensate at least partially for the hearing loss resulting from this hearing impairment. Hearing aids usually have at least one electro-acoustic input transducer, usually in the form of a microphone, for detecting an acoustic (ambient) sound and converting it into an electrical input signal. In addition, such hearing aids normally have a signal processing unit that is configured to analyze the input signal or signals for interference components (e.g. signal noise, ambient acoustic noise and the like), to filter and/or attenuate these interference components, and to amplify the remaining signal components as a useful signal (such as, in particular, speech and/or music).

To output the input signal processed in this way to the auditory system, hearing aids usually contains an electro-acoustic output transducer, e.g. in the form of a loudspeaker (also referred to as a receiver), by means of which the processed input signal is converted into an output acoustic signal and output to the auditory system of the hearing aid wearer. Alternatively, hearing aids have a cochlea or bone-conduction receiver for outputting an electrical or mechanical output signal to the auditory system.

However, the term "hearing instrument" also includes so-called tinnitus maskers, which often emit user-specific noise to the auditory cortex, or other devices for sound output, such as headsets (headphones), wireless headphones with and without active noise cancellation, so-called "hearables" and the like.

Signal processing units of hearing aids, in particular, usually contain stored device-specific, comparatively complex algorithms for signal processing of the input signals. In order to be able to adapt the respective hearing aid to an individual hearing aid wearer, these algorithms are based on variable parameters, the limits of which are specified on a wearer-specific basis when the hearing aid is adapted to the hearing aid wearer.

The signal processing can sometimes vary drastically depending on the general acoustic conditions, in particular the so-called listening situation. A listening situation is usually defined as a typical representative of ambient situations with the same acoustic characteristics, e.g. "hearing aid wearer in conversation with a second person at rest", "conversation in ambient noise", "presence in nature", "presence in a public place", and can be detected by means of an analysis of the input signal with regard to the said characteristics. Individual sub-processes of the signal processing in a hearing aid, such as the recognition of a user's own speech activity or a direction of a useful signal source, can become complex in different ways depending on the listening situation and in this respect require different resources in order to be able to determine a result with sufficiently high reliability.

SUMMARY OF THE INVENTION

It is therefore the object of the invention to at least improve the detection of parameters relevant to the signal processing according to an ambient situation for the signal processing of a hearing instrument.

The above object is achieved according to the invention by a method for operating a hearing aid system having a hearing instrument, wherein at least one electro-acoustic input transducer of the hearing instrument generates an input signal from an acoustic signal from the environment. An output signal is generated from the input signal by means of a signal processor, and an output acoustic signal is generated from the output signal by an electro-acoustic output transducer of the hearing instrument.

It is provided that, for at least one sub-process of the signal processing, an artificial neural network is used which is implemented in the hearing instrument and a topology of the artificial neural network is defined, in particular automatically, and/or weights between individual neurons of the artificial neural network are selected, in particular automatically, according to an operation to be performed in the sub-process and/or according to an ambient situation and/or according to a user input by a user of the hearing aid system. Advantageous embodiments, some of which are inventive in themselves, are the subject matter of the dependent claims and the following description.

The hearing aid system can consist, on the one hand, of the hearing instrument or, on the other hand, it can comprise an auxiliary device in addition to the hearing instrument, which can be connected in particular to the hearing instrument for data transmission. The auxiliary device can be a smartphone, a smartwatch or a tablet PC. In general, the hearing instrument can be provided by a hearing aid, in particular. However, the hearing instrument can also be provided by a pair of headphones, a headset, a so-called "hearable", or another device to be worn on the ear, which is configured as described. In particular, the user of the hearing aid system is also the user of the hearing instrument.

An electro-acoustic transducer in this case includes any transducer which is configured to generate a corresponding electrical signal from an acoustic signal. In particular, the generation of the first or second input signal by the input transducer can also include a pre-processing stage, e.g. in the form of a linear pre-amplification and/or an A/D conversion. The input signal generated accordingly is formed in particular by an electrical signal, the current and/or voltage fluctuations of which essentially represent the sound pressure fluctuations of the air.

Accordingly, an electro-acoustic output transducer includes, in particular, any transducer that is configured to generate from an electrical signal a corresponding acoustic signal, the sound pressure fluctuations of which essentially reflect the current and/or voltage fluctuations of the electrical signal.

The signal processing of the input signal for generating the output signal is preferably carried out in a corresponding signal processing unit, which is particularly preferably arranged in the hearing instrument.

A sub-process of the signal processing contains, in particular, any conversion of a first intermediate signal into a second intermediate signal by means of a frequency band decomposition and/or a possibly frequency-band- and/or time- and/or level-dependent amplification and/or an (in particular adaptive) filter or the like, wherein the first intermediate signal has been derived from the input signal or can also be given by the input signal itself (in which case the derivation is trivial), and the output signal is derived from the second intermediate signal or can also be given by the second intermediate signal itself (in which case the derivation is trivial).

In other words, a sub-process of the signal processing should be understood in particular as a modification of signal components within the signal flow.

For at least one such sub-process, an artificial neural network (deep neural network, DNN) is now used. The DNN can, on the one hand, carry out the sub-process itself, i.e. effect a corresponding modification of signal components, or else perform an operation to obtain a characteristic and/or control parameter for the sub-process, i.e. in the broadest sense, perform an analysis of signal components for the sub-process.

Such an operation of the analysis for the sub-process contains, in particular, obtaining a characteristic parameter and/or control parameter of the signal processing from the input signal or an intermediate signal derived from it, e.g. obtaining a signal to noise ratio (SNR), recognizing a user's own voice or a speech activity in general, detecting a direction of a useful or interference signal source, etc.

The design of a DNN is based on a brain as a biological model. herefore, it contains a large number of nodal points (or nodes) that mimic neurons (and are therefore also referred to as neurons of the DNN), as well as a multiplicity of connections that mimic synapses (the connections between the neurons).

A topology of a DNN here means the arrangement of its individual neurons in different layers—an input layer and an output layer as well as intermediate ("deep-lying") layers—as well as the arrangement of the connections between individual neurons. The connections can also be recursive, i.e. leading from a neuron in a layer closer to the output layer to a neuron in a layer closer to the input layer, or cause a pure forward propagation ("feed forward") by a particular connection skipping over an entire layer between the input and output layers. The number of neurons in the individual layers and the respective complexity of the layers is crucial to the ability of the artificial neural network to be able to cope with the tasks it is expected to complete.

The neurons of the input layer now accept appropriately processed signal components and/or other input variables from outside the DNN as input, and the signal is propagated through the DNN via the neurons to the output layer, the neurons of which transmit suitably processed signal components and/or analysis results to the outside.

The input signal components or variables are, in particular, samples of the input signal or an intermediate signal derived from it, a frequency-band channel of the input signal (or a corresponding intermediate signal), spectral components ("time frequency bins") of a suitable time window (usually a so-called "frame" of e.g. 128 samples in length) in the time-frequency domain, or also possibly frequency-band-specific levels (for the particular frame).

These input variables are fed to the input layer. The connections between the neurons of the individual layers are provided with weights to propagate the input variable to the output layer. In a so-called "perceptron", for example, the inputs of each neuron of a layer are weighted with appropriate weights and summed, wherein the respective neurons provide an output to the next layer (preferably as a Boolean value 1) according to a specific activation function for the weighted sum. In other configurations, a signal that is received on a neuron with multiple outgoing connections can be distributed over the outgoing neurons of the respective neuron according to the weights specified for the operation to be performed.

The signal strengths of output signals output at the neurons of the output layer then represent the result of the signal processing sub-process or the associated signal analysis operation: a neuron of the output layer represents a possible sample (for direct signal processing by means of the DNN, e.g. for noise suppression or directional microphony), a signal component (possibly also as a magnitude and/or phase component or a real and/or imaginary part of a signal component), a spectral component in a frequency band, a range of values such as an angle range (for determining the direction of a useful signal source as the operation to be performed) or also a Boolean value or a probability, e.g. for a voice or speech activity of a specific speaker (for example, the user or an interlocutor).

The weights are determined during a training phase. This can be accomplished in particular by a DNN of the same topology iteratively performing the required operation in the signal processing sub-process, wherein the result of the DNN is compared against a reference result (e.g. in the case of speech detection: was there actually speech present in the signal component?), and at the same time correcting errors in the result for a subsequent iteration step. By appropriate correction of the output in the event of an error ("back propagation"), in particular the weights of the connections for the intended operation are adjusted. In particular, this implements the "trained" DNN for the desired operation, so that a DNN of the same topology can be brought to the trained state by corresponding transfer of the weights.

If the DNN is implemented as a perceptron, the associated activation functions can also be defined in the manner specified for the weights, i.e. in particular having the same dependence on an operation to be performed in the sub-process or the same dependence on an ambient situation or dependence on a user input by a user of the hearing aid system. These activation functions can also be determined in a training phase, preferably together with the associated weights.

The topology of the DNN is defined according to the operation that is to be performed as part of the signal processing sub-process. For example, the wearer's own voice can be detected ("own voice detection", OVD) using a DNN with a different topology than the detection of a direction of a useful signal source ("direction of arrival", DOA).

It is also possible, however, that an ambient situation is detected, in particular on the basis of the input signal, and the topology is defined on the basis of the ambient situation. An ambient situation can be characterized on the one hand by an acoustic environment, so that a classification into standardized listening situations based on corresponding acoustic characteristics also defines the topology of the DNN. On the other hand, an ambient situation can also be characterized by a location (in particular inside/outside of a closed room) as well as by a movement of the user of the hearing instrument, which can be determined by one or more suitable sensors (acceleration sensor, GPS, etc.).

After the topology of the DNN has been defined, the individual weights can also be selected depending on the operation to be performed and/or on the ambient situation and/or on a user input. In this case, appropriate weights for specific topologies are preferably stored in the hearing instrument or, if present, in the auxiliary device for the corresponding ambient situation (listening situation and/or other environment), which are then applied to the DNN. In particular, if the weights are stored in the auxiliary device they are transferred from the auxiliary device to the hearing instrument as necessary.

The adaptation of the topology to the operation and/or the ambient situation allows the option to select or define an optimal topology for the requirements and conditions in any situation, so that no computational "overhead" is required in the DNN, which might simply remain unused or only lead to computational redundancies.

The topology of the DNN is defined according to the operation to be performed in the sub-process, wherein weights between individual neurons of the DNN are selected according to an ambient situation. This has the advantage that the topology can be optimally matched to the operation to be performed so that, for example, an unnecessarily large and/or complex DNN does not need to be used. For the implementation of the DNN in the hearing instrument, the resources available there can thus be optimally used for the desired operation. Moreover, the signal processing does not require any further transmission of the DNN operation, so the sub-process can be directly integrated into the further signal processing of the hearing instrument. In addition, it is possible to take into account, for example, a change in the external conditions and thus the ambient situation by adjusting the weights of the DNN without the need to implement a completely new DNN with a modified topology, which further reduces the implementation effort. If the DNN is implemented as a perceptron, the activation functions are also selected according to the same criteria as the weights.

The DNN in this case is implemented in the hearing instrument. On the one hand, the mentioned use of a DNN is advantageous for at least one sub-process of the signal processing in the hearing instrument since the resources available in the hearing instrument can thus be optimally used for the operation to be performed as a result of the described conditions on the DNN. On the other hand, when the DNN is implemented in the hearing instrument, it is not necessary to transmit signal components to an auxiliary device, thus speeding up the signal processing and also saving battery power.

In addition, it is advantageous here if the weights between individual neurons of the DNN are also defined according to an ambient situation (and also, if necessary, according to the operation to be performed in the sub-process). The ambient situation is determined in the hearing instrument itself. Particularly in the case of a hearing aid with multiple microphones, an acoustic ambient situation (a so-called listening situation) can be determined, wherein, if appropriate, a general ambient situation can be determined on the basis of further information that can be acquired by means of other sensors (such as an acceleration sensor or similar, which can also be arranged in the hearing aid). The determination of such a listening situation on the basis of multiple input signals of a hearing aid is particularly accurate due to the possibility it provides of directional processing for detecting the listening situation, and in particular it can also react quickly to a sudden change in a listening situation (which in turn can have an effect on the weights to be applied). In addition, defining the weights based on an analysis of the input signal (or input signals) of the hearing instrument advantageously exploits the fact that the signal components to be used for the analysis and thus for the weights of the DNN are generated at the same place as the signal components to be processed by the DNN. This enables a high spatial consistency of the signal processing to be achieved (e.g. with regard to the so-called "spatial cues").

It is advantageous that a parameter relevant to the signal processing is determined as the operation to be carried out in the sub-process of the signal processing. The DNN is preferably used to determine the parameter. The determination of a parameter relevant to the signal processing contains in particular the fact that the operation performed by the DNN determines a scalar or vector-valued variable, which is used as a control variable at least in a sub-process of the further signal processing. In particular, no immediate signal components are generated as a result of the operation performed by the DNN that might enter into the output signal. The DNN is particularly efficient in determining such a characteristic or control variable.

Advantageously, at least one of the following variables is used as the parameter for the signal processing: a voice activity, an activity of the user's own voice, a direction of a sound source, a speech detection, a recognition of a specific speaker, a classification of a listening situation, a characteristic variable for noise suppression, a characteristic variable for directional microphony. This means in particular that the corresponding operation performs a voice activity detection (VAD), an OVD, a DOA, a detection (i.e. identification) of a specific speaker, a classification of the listening situation, a noise suppression, or directional microphony. These parameters are particularly important in the signal processing of hearing instruments since a primary objective of a hearing instrument is often to discriminate useful signals from interference signals, which can be achieved particularly well by direction-dependent signal processing such as directional microphony, and also to reproduce speech signals as intelligibly as possible. A characteristic variable for noise suppression can include both a signal-to-noise ratio ("SNR") and, in particular, a signal component of a noise-suppressed signal. A characteristic variable for directional microphony can include both a directional parameter and, in particular, a signal component of a directional signal.

Advantageously, the input signal is used to determine, preferably in the hearing instrument, an acoustic ambient situation and/or a characteristic parameter for a noise signal in the input signal, wherein weights between individual neurons of the DNN are selected on the basis of the acoustic ambient situation or the characteristic parameter for the noise signal in the input signal. This includes, in particular, the fact that the input signal is used to determine, preferably in the hearing instrument, the current listening situation and/or a background noise, its level and/or the SNR, and that the weights of the DNN are selected according to similar criteria, in particular from a tabulated specification. This is particularly advantageous when the topology of the DNN is specified according to the operation to be carried out by the DNN, as this enables a rapid adaptation of the DNN to modified acoustic conditions with low computational complexity. If the DNN is implemented as a perceptron, the activation functions are also selected according to the same criteria as the weights.

Another advantage is that if, on the basis of at least one sensor of the hearing aid system, a first information item about a state of movement and/or a location of the user of the hearing aid system is determined, weights between individual neurons of the DNN are selected on the basis of the first information item. The sensor can be provided by an acceleration sensor or by a sensor that is configured to receive a GPS signal. In particular, such a GPS-enabled sensor can be arranged in an auxiliary device such as a smartphone. Based on the information, which is determined by the or each sensor as described, it is possible in particular to draw conclusions as to a location, namely whether the hearing aid is located outdoors (and in a place with high or low expected noise levels, e.g. main road vs. forest) or in an enclosed space. Moreover, a temperature sensor, possibly in combination with a corresponding GPS-enabled sensor, can also allow a similar conclusion as to location.

Preferably, at least one of the following variables is used as input variables of the DNN: spectral components of the input signal in the time-frequency domain, signal components of the input signal in the time domain, frequency-band-specific signal levels of the input signal in the time-frequency domain, magnitude and/or phase components of a corresponding decomposition of the input signal, real and/or imaginary part of a corresponding decomposition of the input signal. Spectral components ("time frequency bins") are preferably acquired over a suitable time window (usually a frame of e.g. 128 samples in length) in the time-frequency domain, by transforming the samples of each frame into the time-frequency domain by means of a Fast Fourier Transform (FFT) or similar, with a temporal shift of e.g. 16 samples between two consecutive frames (hence two consecutive frames overlap considerably in some cases, in the present numerical example by 128−16=112 samples).

The signal components of the input signal in the time domain are in particular samples of the input signal or of an intermediate signal derived from it, or of a frequency-band channel of the input signal (or a corresponding intermediate signal) over a suitable time window (e.g. over one or more frames). Frequency band-specific signal levels of the input signal in the time-frequency domain are preferably collected for the respective frame or a suitable comparable time window. These input variables can be collected in a simple way without significant additional effort, and usually occur in at least one sub-process of the signal processing anyway.

A binaural hearing aid with two local devices is conveniently used as a hearing instrument, wherein a DNN is implemented in each of the two local devices and different parameters relevant to the signal processing are determined in the DNNs of the two local devices. This may include, for example, a DNN performing a VAD in a local device worn by the user on the left ear, while in the local device worn by the user on the right ear, a DNN determines a DOA of a useful signal. By determining different parameters, the individual operations can be divided between both local devices, so that excessive computing resources do not have to be provided in the individual local device.

The invention also relates to a hearing aid system containing a hearing instrument having at least one electro-acoustic input transducer for generating an input signal from an acoustic signal from the environment, a signal processing unit for generating an output signal from the input signal, and an electro-acoustic output transducer for generating an output acoustic signal from the output signal. The hearing instrument also contains a DNN which is configured to perform at least one sub-process of a signal processing implemented in the signal processing unit for generating the output signal from the input signal, wherein the hearing aid system is configured to define a topology of the DNN and/or to select weights between individual neurons of the DNN according to an operation to be performed in the sub-process and/or according to an ambient situation and/or according to a user input by a user of the hearing aid system. In particular, the signal processing unit of the hearing instrument contains at least one signal processor. The DNN is preferably implemented on the signal processor. The hearing aid system can also consist of the hearing instrument alone.

The hearing aid system according to the invention shares the advantages of the method according to the invention. The advantages specified for the method and for its extensions can be transferred mutatis mutandis to the hearing aid system. In particular, the hearing aid has an auxiliary device, wherein a data connection can be established between the hearing instrument and the auxiliary device and at least some functions of the hearing instrument can be controlled by the auxiliary device.

Other features which are considered as characteristic for the invention are set forth in the appended claims.

Although the invention is illustrated and described herein as embodied in a method for operating a hearing aid system having a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Equivalent parts and dimensions are provided with identical reference signs in all figures.

Figure 1:
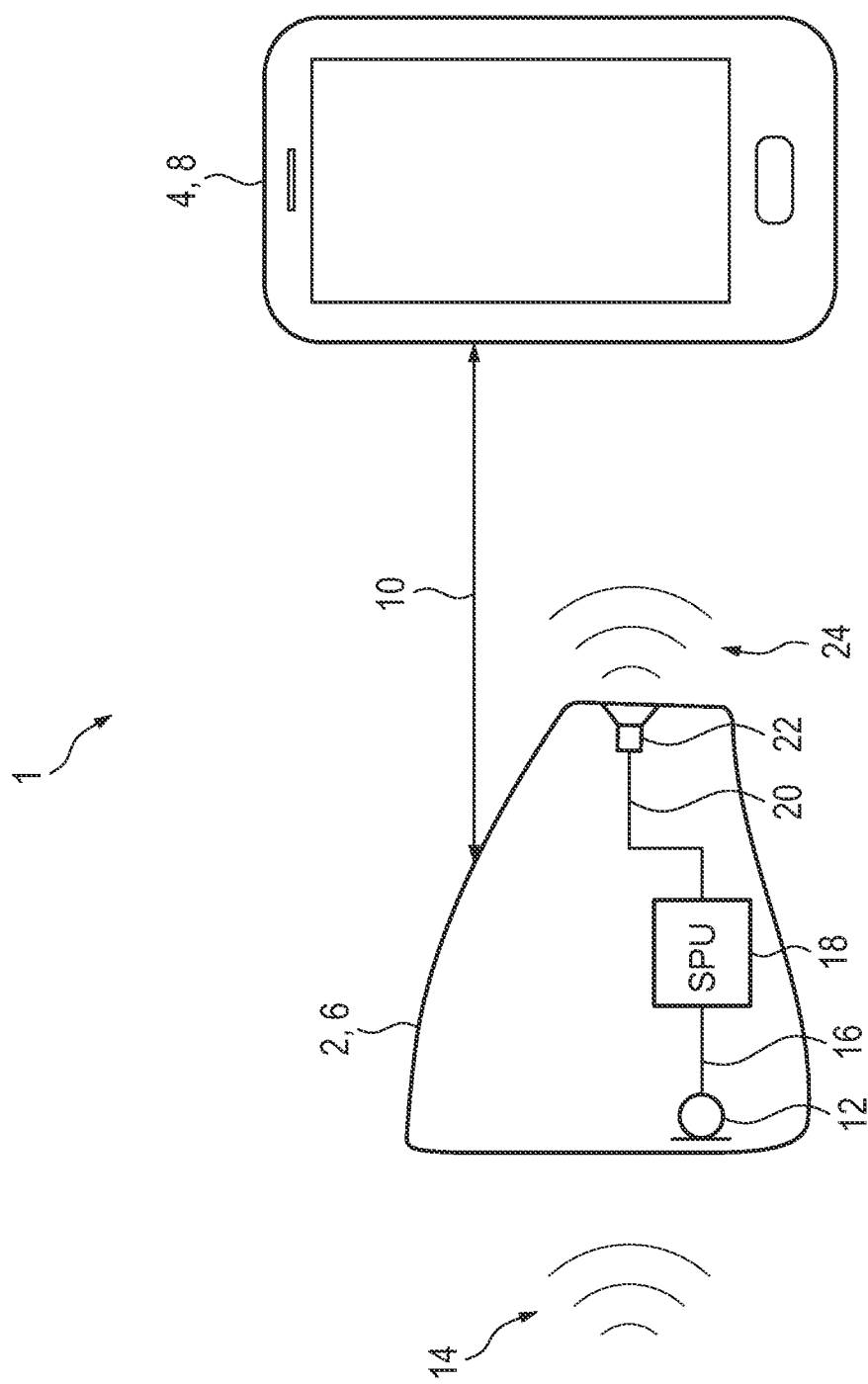
FIG. 1 is a block diagram showing a hearing aid system with a hearing aid and a smartphone.

Referring now to the figures of the drawings in detail and first, particularly to FIG. 1 thereof, there is shown a schematic block diagram of a hearing aid system 1 which has a hearing instrument 2 and an auxiliary device 4. The hearing instrument 2 is designed in this case as a hearing aid 6, which is worn on an ear by a user, not shown in detail, during intended operation, in particular to compensate for a hearing loss. The auxiliary device 4 in this case is implemented as a smartphone 8, wherein comparable implementations, for example, as a tablet PC or a smartwatch (not shown in either case) are also conceivable. The smartphone 8 can be associated with the hearing aid 6 in the sense that a bidirectional data connection 10 can be established between the hearing aid 6 and the smartphone 8, and at least some functions, such as hearing programs of the hearing aid 6, can be controlled by the smartphone 8.

The hearing aid 6 has an electro-acoustic input transducer 12, which in this case is formed by a microphone. The input transducer 12 is configured to generate an input signal 16 from an acoustic signal 14. The input signal 16 is fed to a signal processing unit 18 which has at least one signal processor (not shown). In the signal processing unit 18, the input signal 16 is processed in such a way that, for example, a useful signal contained in the acoustic signal 14 is enhanced relative to interference signals also contained in the acoustic signal 14. In addition, the signal processing in the signal processing unit 18 also takes account of the hearing loss of the user of the hearing aid 6, for example by increasing or decreasing signal components in individual frequency bands and, if necessary, by applying appropriate compression. The signal processing unit 18 outputs an output signal 20 which was generated by the processing of the input signal 16 just described. The output signal 20 is converted into an output acoustic signal 24 by an electro-acoustic output transducer 22, which in this case is provided by a loudspeaker.

In generating the output signal 20 from the input signal 16 in the signal processing unit 18, various sub-processes of the signal processing are carried out. These sub-processes can be, for example, the frequency-band-specific increase or decrease of signal components already mentioned, but on the other hand they can also involve determining a corresponding control variable, for example in order to be able to estimate useful signal components and/or to identify them as speech, for example by means of an OVD or a VAD. In the case that the hearing aid 6 is configured for a directional signal processing of the input signal 16 and an additional input signal generated by another input transducer (not shown) from the acoustic signal 14, directional information (DOA) of a useful signal source can also be used as such a control variable. At least one such sub-process is then performed in the signal processor of the signal processing unit 18 using a DNN.

Figure 2:
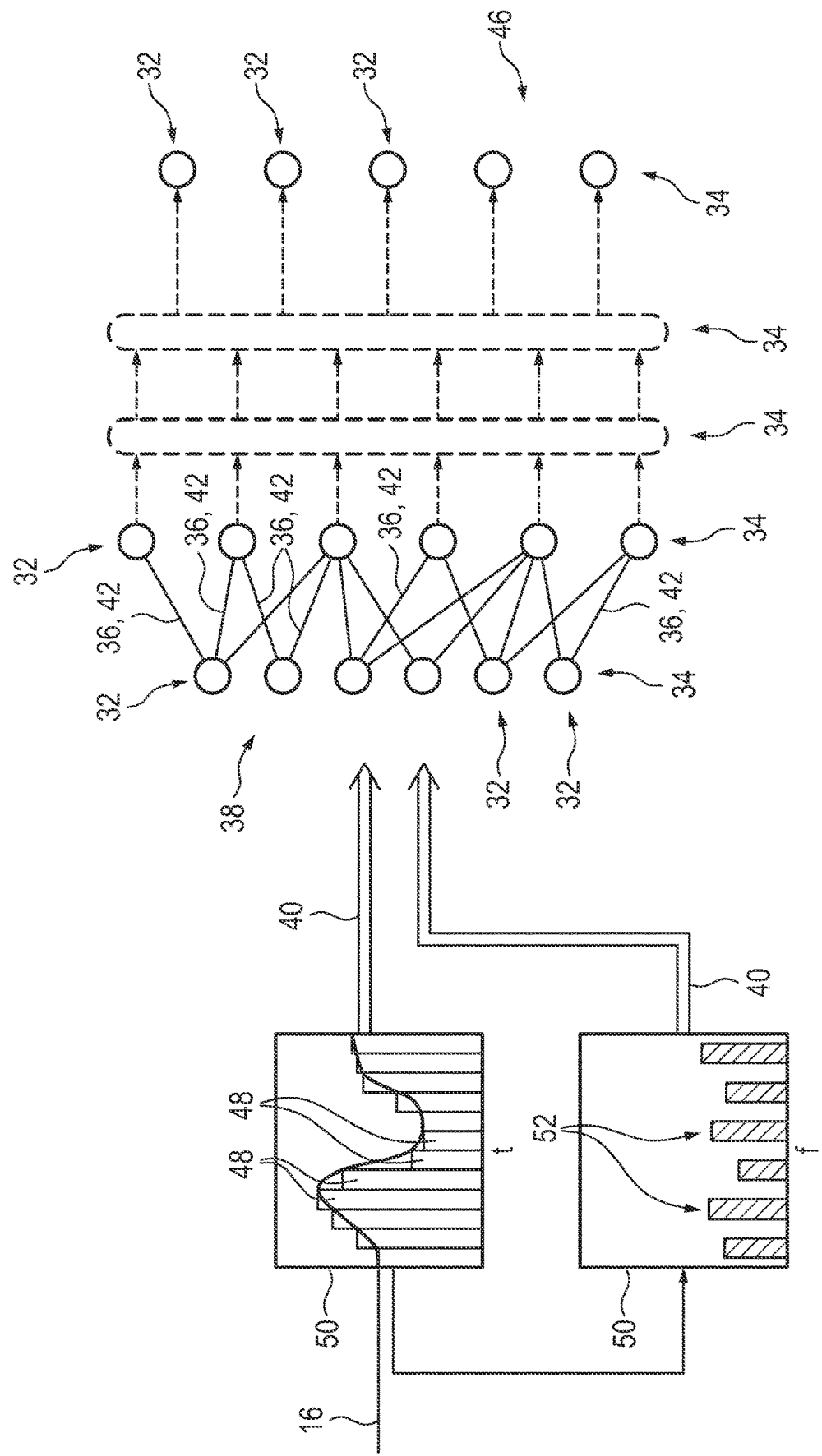
FIG. 2 is a block diagram of a DNN for use in a sub-process of the signal processing in the hearing aid according to FIG. 1.

FIG. 2 schematically shows a block circuit diagram of a DNN 30 which is used for a sub-process of the signal processing of the hearing aid 6 according to FIG. 1. The DNN 30 has a multiplicity of nodes, so-called neurons 32 which are arranged relative to each other in individual layers 34, and different layers 34 are connected by connections 36 between neurons 32. At an input layer 38, input variables 40 are transferred to the respective neurons 32. For each neuron 32 of the input layer 38, the individual signal strengths of the relevant input variable 40 are then multiplied by weights 42, which are assigned to each connection 36 between two neurons 32 of adjacent layers 34, and thus propagated to the next layer 34. In particular, this means that the weights 42 which are assigned to the outgoing connections from a neuron 32 decide how a signal arriving at the neuron 32 is distributed over the neurons 32 of the subsequent layer. In a similar way, input variables 40 are propagated on through the deep-lying layers 44 (layers and connections only schematically represented by dashed lines and without regard to the topological structure) as far as an output layer 46. Thus, for a given topology of the DNN 30, the dynamics of the propagation of input variables 40 through the DNN 30 is determined by the respective weights 42. Signal strengths output at the individual neurons 32 of the output layer 46 form the result of the operation performed by the DNN 30.

As input variables 40, in this case individual samples 48 of a given frame 50 of the input signal 16 in the (discretized) time domain are transferred to the neurons 32 of the input layer 38. Instead of these samples 48 of the input signal 16, however, it would also be conceivable to provide a comparable signal vector of a signal derived from the input signal 16, for example, an input signal possibly pre-processed in a frequency-band-specific way and/or cleaned by an acoustic feedback, or similar (not shown). As additional or alternative input variables 40, spectral components 52 of the respective frame 50 of the input signal 16 are transferred, for which purpose the respective frame is transformed into the time-frequency domain (not shown), for example by means of an FFT.

The input variables 40 mentioned are then propagated in the described manner according to the weights 42 along the connections 36 through the individual layers 34 of the DNN 30 up to the neurons 32 of the output layer 46, at which a result of the operation performed can be tapped off via relevant signal strengths.

Figure 3:
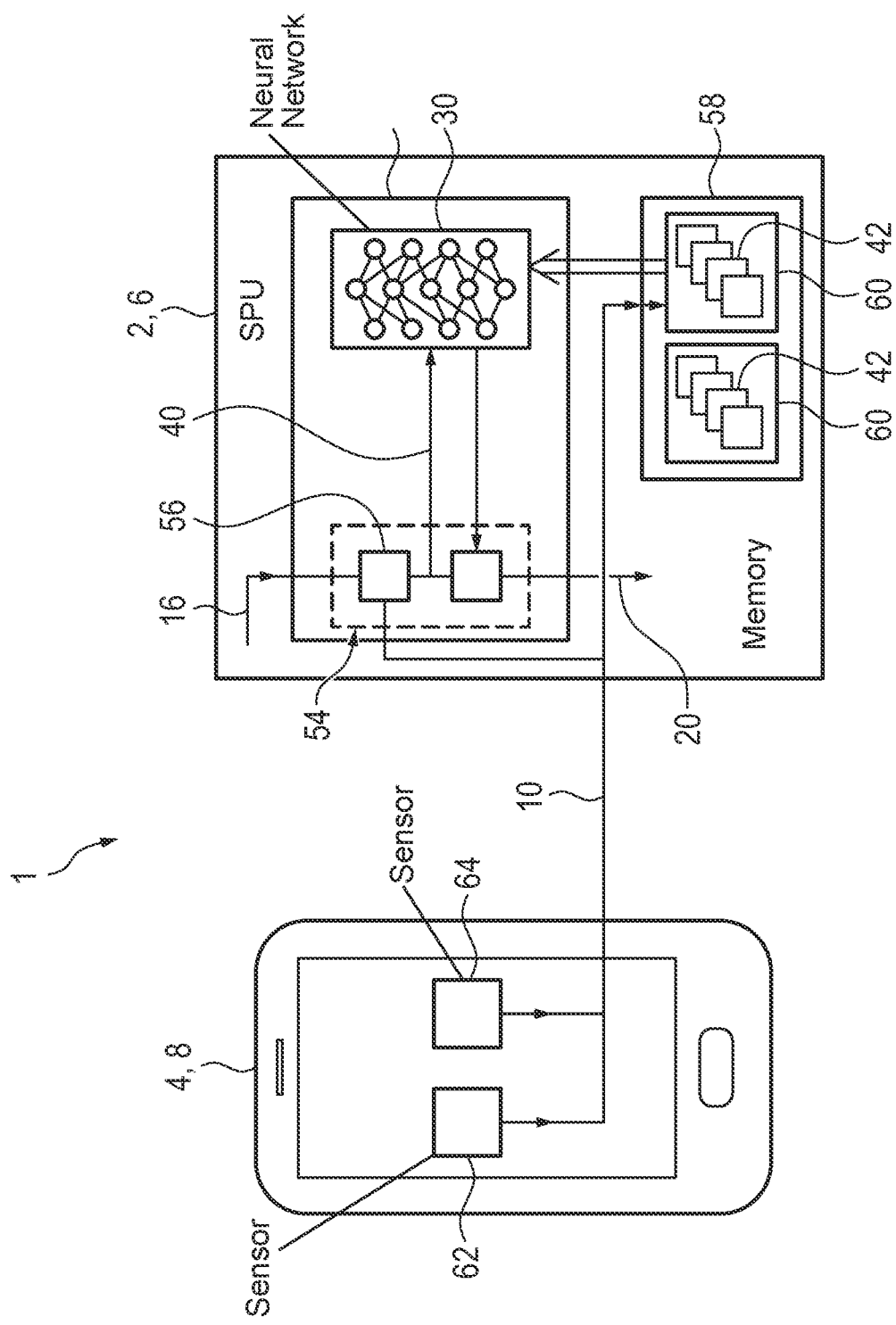
FIG. 3 is a block diagram of a selection of the structural and dynamic properties of the DNN according to FIG. 2 by the hearing aid system according to FIG. 1.

FIG. 3 shows the hearing aid system 1 according to FIG. 1 schematically in a block diagram, wherein the DNN 30 according to FIG. 2 is implemented in the signal processing unit 18 of the hearing aid 6. The hearing aid 6 is only shown schematically here. As part of a sub-process of the signal processing which is applied to the input signal 16 in the hearing aid 6 for generating the output signal 20, a specific operation (e.g. an OVD, VAD or detection of a DOA) is to be carried out by means of the DNN 30, as shown schematically in FIG. 2. In order to make optimum use of the resources available in the signal processing unit 18 for implementing the DNN 30, the structure—i.e. the topology of the DNN 30—is adapted to the operation to be performed. This means, in particular, that for an OVD, for example, a DNN 30 with different structural properties (a different topology) can be used than for the detection of a DOA (even if these structural differences do not have to be strictly necessary, and can also always depend on the actual implementation).

The DNN 30 can be implemented in the signal processing unit 18 on the one hand on a signal processor (not shown in detail), which on the one hand can be designed generically and can therefore also be designed and configured for other tasks, or, on the other hand, it is specifically designed (for example, as a so-called neuromorpher chip) for the implementation of various DNNs 30 (with different topologies). In particular, a special ASIC can also be used.

In the signal processing unit 18, a preliminary analysis 56 of the input signal 16 is now carried out as part of a signal flow 54. In particular, a current listening situation is identified. For the present listening situation, for the different topologies for the DNN 30 (which are assigned to the different operations to be performed), individual sets 60 of weights 42 are stored in a non-volatile memory 58 of the hearing aid 6. From the memory 58, the set 60 of weights 42 for the DNN 30 which is intended for the topology of the DNN 30, defined according to the operation to be performed, of the listening situation determined in the analysis 56, is then loaded into the signal processing unit 18.

The smartphone 8 also contains an acceleration sensor 62 and a GPS-enabled sensor 64, which on the one hand provide information on the movements of the user of the hearing aid system 1, and on the other hand provide information on the user's exact location. In addition, a user input can be made on the smartphone using a corresponding application (not shown in detail), e.g. for the user to select a listening situation or an appropriately assigned hearing program. The said information and, if applicable, the user input can then be additionally used to select the set 60 of weights 42 for the DNN by transferring the information from the smartphone 8 to the hearing aid 6 via the data connection 10 and analyzing it there accordingly. The weights 42 can also be stored in a non-volatile memory of the smartphone 8 (not shown), in which case the hearing aid 6 submits a request to the smartphone 8 via the data connection 10, which at least implicitly informs the smartphone 8 of the topology of the DNN 30 to be implemented in the hearing aid 6, so that for the ambient situation determined on the basis of the mentioned sensors, the corresponding set of weights for the relevant topology of the DNN 30 can be transferred to the hearing aid 6.

In addition, the smartphone 8 can also be used by the hearing aid 6 as simply a form of "memory expansion", namely by having all the steps by which the set 60 of weights 42 for the DNN 30 is determined, in particular the generation of the input signal 16 and the preliminary analysis 56 of the input signal 16, running on the hearing aid 6 itself. The signal processing unit 18 in the hearing aid 6 then determines the required set 60 of weights 42 for the DNN 30, and a corresponding request is sent to the smartphone 8 which loads these weights 42 (which can be tabulated for different topologies of the DNN 30 based on the determined listening situation) from a non-volatile memory and transfers them to the hearing aid 6, where the weights 42 are implemented in the DNN 30. In the case described here, which is not shown separately in FIG. 3, in particular no additional information from sensors of the smartphone 8 is thus used for the selection of the weights 42.

The input variables 40 are passed to the DNN 30, and the result is re-integrated into the signal flow 54 in which the output signal 20 is generated from the input signal 16. In particular, the hearing aid 6 can also have a further input signal here (not shown), which is generated e.g. by a further electro-acoustic input transducer (see FIG. 1).

An alternative way of implementing the DNN 30 in the hearing aid 6 is to select not only the weights 42 for the DNN 30 implemented in the signal processing unit 18 based on the listening situation detected in the hearing aid 6 or selected by the user, or based on the sensor signals collected in the smartphone 8. The topology of the DNN 30 can additionally be selected as a result of the listening situation detected in the analysis 56 or selected via user input in the smartphone 8, or on the basis of the movement status and the absolute position (determined by the acceleration sensor 62 and the GPS-enabled sensor 64 in the smartphone 8). In this case also, the corresponding weights 42 are selected based on the information provided or the user input, as well as on the operation to be performed for the subsequent signal flow.

Although the invention has been illustrated and described in greater detail by means of the preferred exemplary embodiment, the invention is not restricted by the examples disclosed and other variations can be derived therefrom by the person skilled in the art without departing from the scope of protection of the invention.

The following is a summary list of reference numerals and the corresponding structure used in the above description of the invention:

1 hearing aid system
2 hearing instrument
4 auxiliary device
6 hearing aid
8 smartphone
10 (bidirectional) data connection
12 input transducer
14 acoustic signal
16 input signal
18 signal processing unit
20 output signal
22 output signal
24 output acoustic signal
30 DNN (artificial neural network)
32 neurons
34 layer
36 connection
38 input layer
40 input variable
42 weights
44 deep-lying layer
46 output layer
48 sample (of input signal)
50 frame (of input signal)
52 spectral component (of a frame)
54 signal flow
56 (preliminary) analysis
58 non-volatile memory
60 set (of weights)
62 acceleration sensor
64 GPS-enabled sensor

The invention claimed is:

1. A method for operating a hearing aid system having a hearing instrument, which comprises the steps of:
generating, via at least one electro-acoustic input transducer of the hearing instrument, an input signal from an acoustic signal from an environment;
generating an output signal from the input signal by means of a signal processor performing signal processing;
generating an output acoustic signal from the output signal by means of an electro-acoustic output transducer of the hearing instrument;
using an artificial neural network for at least one sub-process of the signal processing, being implemented in the hearing instrument; and
defining a topology of the artificial neural network and/or selecting weights between individual neurons of the artificial neural network according to an operation to be performed in the sub-process and/or according to an ambient situation and/or according to a user input by a user of the hearing aid system.

2. The method according to claim 1, which further comprises:
defining the topology of the artificial neural network according to the operation to be performed in the sub-process; and
selecting the weights between the individual neurons of the artificial neural network according to the ambient situation.

3. The method according to claim 1, which further comprises determining a parameter relevant to the signal processing as the operation to be performed in the sub-process of the signal processing.

4. The method according to claim 3, which further comprises using at least one of a following variables as the parameter for the signal processing:
a voice activity;
an activity of the user's own voice;
a direction of a sound source;
a speech detection;
a recognition of a specific speaker;
a classification of a listening situation;
a characteristic variable for noise suppression; and
a characteristic variable for a directional microphone.

5. The method according to claim 1, which further comprises:
using the input signal to determine an acoustic ambient situation and/or a characteristic parameter for a noise signal in the input signal; and
selecting the weights between the individual neurons of the artificial neural network on a basis of the acoustic ambient situation or the characteristic parameter for the noise signal in the input signal.

6. The method according to claim 1, which further comprises:
determining a first information item about a state of movement and/or a location of the user of the hearing aid system on a basis of at least one sensor of the hearing aid system; and
selecting the weights between the individual neurons of the artificial neural network based on the first information item.

7. The method according to claim 1, which further comprises using at least one of a following variables as input variables of the artificial neural network:
spectral components of the input signal in a time-frequency domain;
signal components of the input signal in a time domain;
frequency-band-specific signal levels of the input signal in a time-frequency domain;
magnitude and/or phase components of a corresponding decomposition of the input signal; and
real and/or imaginary part of a corresponding decomposition of the input signal.

8. The method according to claim 1, which further comprises:
using a binaural hearing aid with two local devices as the hearing instrument, wherein the artificial neural network is implemented in each of the two local devices, and wherein different parameters relevant to the signal processing are determined in each of the artificial neural networks of the two local devices.

9. A hearing aid system, comprising:
a hearing instrument containing:
at least one electro-acoustic input transducer for generating an input signal from an acoustic signal of an environment;
a signal processor for generating an output signal from the input signal;
an electro-acoustic output transducer for generating an output acoustic signal from the output signal;
an artificial neural network being implemented in said hearing instrument and configured to perform at least one sub-process of signal processing implemented in said signal processor for generating the output signal from the input signal; and
the hearing aid system configured to define a topology of said artificial neural network and/or to select weights between individual neurons of said artificial neural network according to an operation to be performed in the sub-process and/or according to an ambient situation and/or according to a user input by a user of the hearing aid system.

10. A hearing instrument, comprising:
at least one electro-acoustic input transducer for generating an input signal from an acoustic signal of an environment;
a signal processor for generating an output signal from the input signal;
an electro-acoustic output transducer for generating an output acoustic signal from the output signal;
an artificial neural network which is configured to carry out at least one sub-process of a signal processing implemented in said signal processor for generating the output signal from the input signal; and
the hearing instrument configured to define a topology of said artificial neural network and/or to select weights between individual neurons of said artificial neural network according to an operation to be performed in the at least one sub-process and/or according to an ambient situation.

* * * * *